Aug. 2, 1960    R. H. WENTORF, JR    2,947,617
ABRASIVE MATERIAL AND PREPARATION THEREOF
Filed Jan. 6, 1958    2 Sheets-Sheet 1
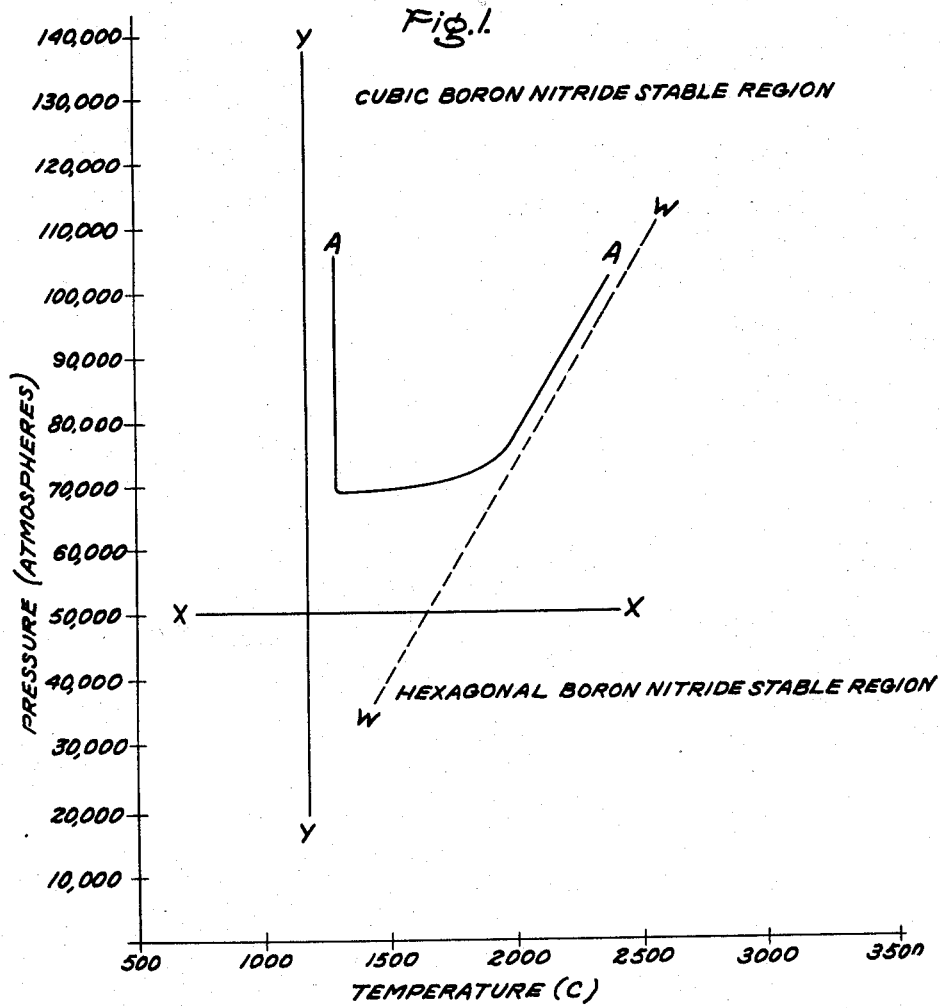
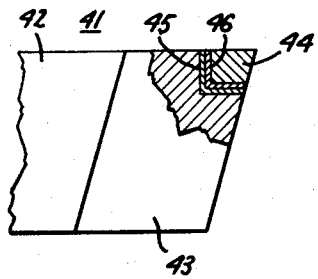
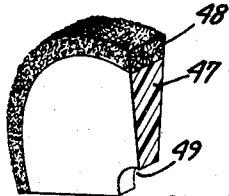
Inventor:
Robert H. Wentorf Jr.,
by Paul A. Frank
His Attorney.

Aug. 2, 1960   R. H. WENTORF, JR   2,947,617
ABRASIVE MATERIAL AND PREPARATION THEREOF
Filed Jan. 6, 1958   2 Sheets-Sheet 2
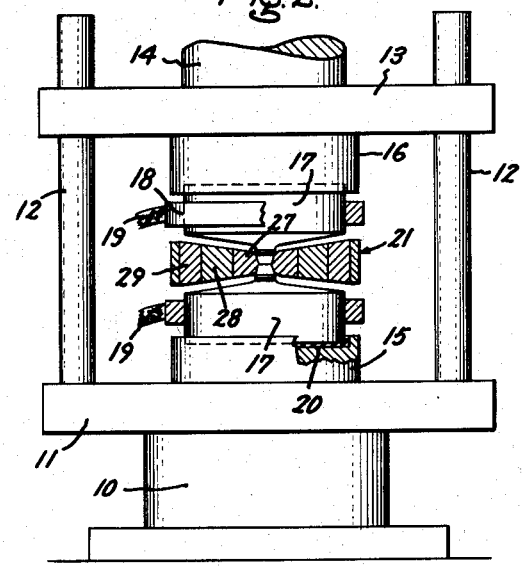
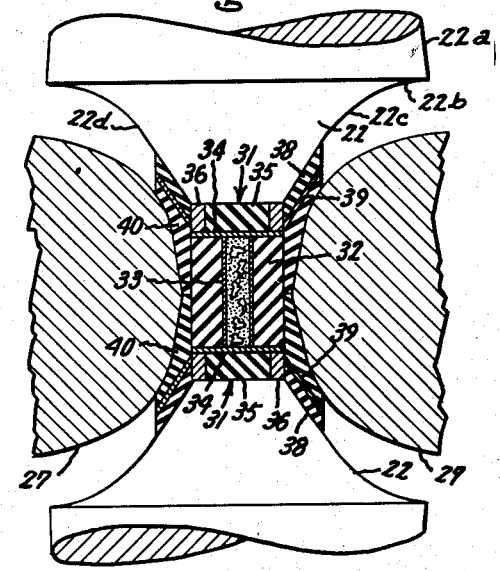
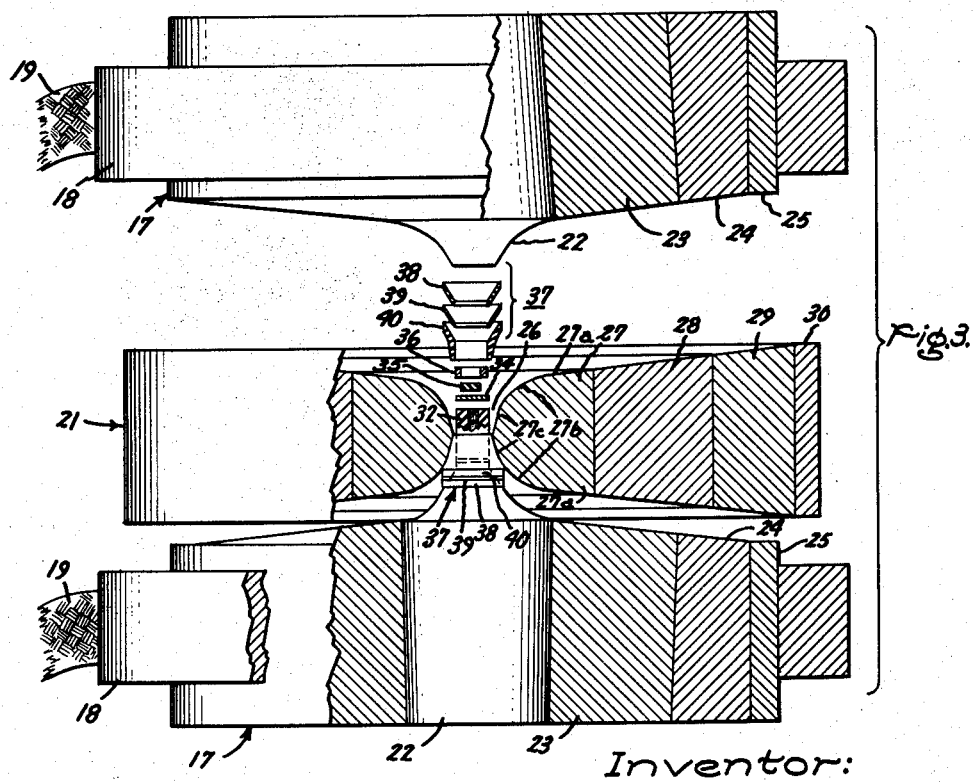
Inventor:
Robert H. Wentorf Jr.,
by Paul A. Frank
His Attorney.

United States Patent Office 2,947,617
Patented Aug. 2, 1960

2,947,617

ABRASIVE MATERIAL AND PREPARATION THEREOF

Robert H. Wentorf, Jr., Schenectady, N.Y., assignor to General Electric Company, a corporation of New York Filed Jan. 6, 1958, Ser. No. 707,434

13 Claims. (Cl. 51—307)

This application is a continuation in part of my copending application Ser. No. 630,706, filed December 26, 1956, now abandoned, and assigned to the same assignee as the present invention.

This invention relates to a new physical form of boron nitride, to the preparation thereof, and to abrasive articles comprising this new form of boron nitride.

A large variety of abrasive materials are employed for industrial purposes. Among these many materials may be mentioned, for example, garnet, boron carbide, diamond, etc. However, all of the presently available abrasive materials are defective in that they are not as hard as desired or they deteriorate rapidly at elevated temperatures. Even diamond, which is the hardest substance known and which is one of the common abrasive materials is subject to deterioration at elevated temperatures. When grinding metals with diamond, it is an accepted fact that the temperature at the interface between the diamond and the metal being ground is in the neighborhood of the melting point of the metal. Thus, where various steels and sintered silicon carbide materials are being ground to shape the diamond employed as a grinding medium often reaches temperatures approaching 1500-2000° C. At this temperature diamond is subject to two dificiencies. The first is that diamond reacts readily with oxygen in the air and "burns" away. In addition, at these elevated temperatures the diamond is converted to its graphitic form which is relatively soft and useless in grinding operations.

An object of my invention is to provide a new abrasive material which has a hardness substantially equal to the hardness of diamond while exhibiting thermal stability superior to presently available abrasive materials.

A further object of my invention is to provide a method for the preparation of the aforementioned abrasive material.

A still further object of my invention is to provide abrasive articles including the aforementioned new abrasive material.

These and other objects of my invention are accomplished by providing cubic boron nitride which has an atomic configuration corresponding to the atomic configuration of zincblende (ZnS). This new cubic form of boron nitride is prepared by converting the common form of boron nitride to the cubic form under the action of heat and pressure. More particularly, this cubic form of boron nitride is prepared by subjecting ordinary boron nitride to an elevated temperature and pressure in the presence of at least one catalyst selected from the class consisting of alkali metals, alkaline earth metals, tin, lead, antimony and nitrides of the foregoing metals, the pressure and temperature being selected to be in the range in which the catalyst is operative to catalyze the conversion of ordinary boron nitride to cubic boron nitride. The abrasive articles of the present invention are prepared by bonding cubic boron nitride to a base member by any suitable means.

My invention may be best understood by reference to the following detailed description in combination with the drawings in which:

Fig. 1 shows a pressure-temperature phase diagram for boron nitride;

Fig. 2 is a front elevational view of a hydraulic press with a high temperature-high pressure apparatus which may be employed in practicing my invention;

Fig. 3 is an enlarged, exploded sectional view of the high temperature-high pressure apparatus of Fig. 2;

Fig. 4 is an enlarged sectional view of the reaction vessel and associated parts which are shown in Figs. 2 and 3;

Fig. 5 illustrates, partly in section, a cutting tool of the present invention; and Fig. 6 illustrates, partly in section, a grinding wheel of the present invention.

This application is based on my discovery that there are two distinct crystalline forms of boron nitride. The first form is the common hexagonal form of boron nitride which is illustrated at page 9 of Stillwell, "Crystal Chemistry," McGraw-Hill Book Company, Inc., New York (1938). This common type of boron nitride, referred to hereinafter as "hexagonal boron nitride," is a relatively soft, powdery material which is completely useless for abrasive purposes. The boron nitride of the present invention, hereinafter referred to as "cubic boron nitride" has a cubic crystalline configuration analogous to the configuration of zincblende and has a unit cell edge length of 3.615 Angstroms. This cubic boron nitride has a hardness substantially equal to the hardness of diamond and is thermally stable at a temperature as high as 2000° C.

Although I do not wish to be bound by theory, it is believed that hexagonal boron nitride is thermodynamically stable in one region of temperature and pressure while cubic boron nitride is thermodynamically stable in another region of temperature and pressure. This is illustrated in Fig. 1, which is a pressure-temperature phase diagram for boron nitride. The dashed line WW shown in the drawing represents an equilibrium line or the center of an equilibrium zone or the center of a zone whose limits cannot be determined with complete precision between conditions of pressure and temperature at which cubic boron nitride is the stable form of boron nitride and conditions of pressure and temperature at which hexagonal boron nitride is the stable form of boron nitride. For purposes of the present application, this equilibrium line will be considered to be the actual equilibrium line, although further experimental work may indicate that the shape of this line should be somewhat different or that the line should be displaced somewhat.

The area in Fig. 1 above dashed line WW is the area in which cubic boron nitride is the stable form of boron nitride. The area below the dashed line in the drawing is the area in which hexagonal boron nitride is the stable form of boron nitride. These areas are designated in the figure as the cubic boron nitride stable region and the hexagonal boron nitride stable region. In Fig. 1 temperature in degrees centigrade is plotted as abscissa against pressure in atmospheres as ordinate. From an examination of Fig. 1 it is apparent that hexagonal boron nitride theoretically can be converted to cubic boron nitride by subjecting the hexagonal boron nitride to pressures and temperatures in the cubic boron nitride stable region. Conversely, cubic boron nitride theoretically can be converted to hexagonal boron nitride by maintaining the former under pressure and temperature conditions in the hexagonal boron nitride stable region.

Despite the thoretical possibility of the conversion of hexagonal boron nitride to cubic boron nitride by merely subjecting the latter to pressures and temperatures in the cubic boron nitride stable region, I have found that the conversion does not take place unless certain catalysts are present during the reaction. As previously mentioned the catalysts of the present invention include certain selected metals as well as the nitrides of these metals.

At atmospheric pressure and at temperatures of from room temperature up to 2000° C., there is no tendency for cubic boron nitride to convert to hexagonal boron nitride.

Although the exact mechanism of the conversion of the present invention is not certain, it is believed that the mechanism involves the formatiton of a nitride of the catalyst metal where metals are employed by reaction of some of the boron nitride with the catalyst. The remaining boron nitride then dissolves in the catalyst nitride and then precipitates from the catalyst nitride in the cubic form. This belief is supported by the fact that the color of the cubic boron nitride of the present invention depends upon the particular catalyst employed. Thus, where a metal is employed as a catalyst the cubic boron nitride has a reddish color, indicative of the presence of some elemental boron in the cubic boron nitride. This coloring can be explained by the elemental boron which would be formed when the catalyst metal is converted to its nitride. On the other hand when a catalyst nitride is employed as a catalyst the resultant cubic boron nitride is usually an almost colorless crystal.

From the foregoing, it is seen that the "ultimate" reactants involved in the preparation of cubic boron nitride by the present invention are hexagonal boron nitride and the catalyst nitride. Any combination of starting ingredients which will provide both the hexagonal boron nitride and the catalyst nitride can thus be employed in the practice of the present invention. One additional method of providing this "ultimate" reactant mixture is to start with a reaction mixture of elemental boron and a catalyst nitride. By this procedure, when the reactants are brought to reaction pressure and temperature, an "equilibrium" is established between the reactants so that part of the nitrogen associated with the catalyst becomes associated with the boron so that the reaction mixture at equilibrium contains both the catalyst nitride and boron nitride. This mechanism is illustrated by the preparation of cubic boron nitride from magnesium nitride and elemental boron wherein equilibration of these two reactants at reaction pressure and temperature produces a mixture of magnesium, magnesium nitride, boron, and boron nitride. Since this reaction mixture contains both the catalyst nitride, magnesium nitride and boron nitride, cubic boron nitride is formed under the proper pressure and temperature conditions.

From the foregoing description it is seen that the starting reaction mixture of the present invention must contain a source of boron, a source of nitrogen, and a source of catalyst metal. The source of the boron can be elemental boron, hexagonal boron nitride, or a material such as one of the boron hydrides which will decompose to elemental boron under conditions of the reaction. The source of nitrogen can be either hexagonal boron nitride or a nitrogen-containing compound of a catalyst metal which will provide a source of nitrogen under reaction conditions. The catalyst metal may be employed as the elemental metal or a catalyst compound which will decompose to the catalyst metal or to the catalyst metal nitride under reaction conditions. Illustrative of a catalyst metal compound is in the reaction of calcium cyanamid with boron to produce cubic boron nitride. It is believed that this reaction involves the preliminary decomposition of the calcium cyanamid to produce calcium nitride and boron nitride which together react to form cubic boron nitride.

Thus, in one of its broader aspects the present invention comprises the preparation of cubic boron nitride by subjecting a source of catalyst, a source of nitrogen, and a source of boron to an elevated temperature and pressure, the catalyst being selected from the class consisting of alkali metals, alkaline earth metals, tin, lead, and antimony, with the pressure and temperature being selected to be in the range in which the catalyst is operative to catalyze the conversion of hexagonal boron nitride to cubic boron nitride.

It should be understood that the process of the present invention is not limited to the catalytic conversion of hexagonal boron nitride to cubic boron nitride involving only one catalyst material. Thus, mixtures of two or more of the catalyst materials can be employed. These mixtures can include one or more of the catalyst metals, one or more of the catalyst nitrides or one or more of both the metals and the nitrides. In addition, alloys can also be employed in the practice of the invention. These alloys include alloys of more than one catalyst metal as well as alloys of a catalyst metal and a non-catalyst metal.

In general, the reaction of the present invention is preferably carried out above certain minimums of pressure and temperature. Thus, I prefer to carry out the reaction at a temperature of at least about 1200° C. The pressure of the conversion is generally above a minimum of about 50,000 atmospheres. These minimums of pressure and temperature are illustrated by the lines XX and YY, respectively, in Fig. 1. Thus, in general, I prefer to carry out the reaction in the cubic boron nitride stable region at a temperature of at least about 1200° C. and a pressure of at least about 50,000 atmospheres. The preferred broad range of operating conditions is from about 1200° C. to 2200° C. with a pressure of about 55,000 to 110,000 atmospheres or more. My preferred narrow range of reaction conditions is at a temperature of from about 1500 to 2100° C. at a pressure of about 60,000 atmospheres to 100,000 atmospheres.

In general, I prefer to carry out the reaction of the present invention in the cubic boron nitride stable region under conditions of pressure and temperature close to the dashed line WW of Fig. 1. My preference for operation near the equilibrium line WW is based on the fact that operation near this line tends to facilitate the growth of larger single crystals of cubic boron nitride than do conditions of pressure and temperature in the cubic boron nitride stable region more remote from the equilibrium line.

Although the catalysts of the present invention have been described for use above certain minimums of pressure and temperature in the cubic boron nitride stable region, this does not mean that all of the catalysts are necessarily operative at all pressures and temperatures in the cubic boron nitride stable region above the 65,000 atmosphere and 1200° C. minimums. To understand more clearly the operativeness of catalysts within the cubic boron nitride stable region, reference is again made to Fig. 1. The curved line designated by AA in the drawing indicates the approximate minimums of pressure and temperature and the general area of the cubic boron nitride stable region in which magnesium metal has been shown to be effective in the conversion of hexagonal boron nitride to cubic boron nitride. As indicated by the curve AA, there appears to be no maximum pressure limit at which a given catalyst is operative in the invention. However, the curves indicate to a varying degree maximum temperature limits within which the cubic boron nitride forming reaction may take place. While as a practical matter economics would dictate the use of temperatures and pressures not too far above the indicated minimums, it is evident from the curves that there is an ample pressure and temperature range within which the best mode of carrying out the invention can be practiced.

As illustrative of portions of the ranges of pressure and temperature in which some of the catalysts of the present invention are operative to cause the conversion, reference is made to the table below which illustrates certain of the reaction conditions under which certain of the catalysts have been found to be effective in the conversion of hexagonal boron nitride to cubic boron nitride.

| Catalyst | Approximate Pressure Ranges, Atmospheres | Approximate Temperature Range, °C. |
| --- | --- | --- |
| Mg | 69,000–95,000 | 1,300–2,100 |
| Ca | 69,000–80,000 | 1,300–1,900 |
| Sn | 86,000–90,000 | 1,700–1,900 |
| Li | 73,000–86,000 | 1,300–1,700 |
| Ba | 86,000–89,000 | 1,600–1,700 |
| $Li_3N$ | 55,000–92,000 | 1,600–2,100 |

As shown by the above table, a wide variety of pressures and temperatures may be employed in the method of the present invention. The only limitations on the pressure and temperature are that they be pressures and temperatures in the cubic boron nitride stable region and that they be in the range in which the particular catalyst is operative to effect the conversion.

In carrying out the process of the present invention the ratio of the catalyst material to the hexagonal boron nitride may vary within extremely wide limits. However, in order to have the most efficient reaction, the amount of boron nitride present in the reacton mixture should be sufficient to provide the nitrogen required for the complete conversion of the metallic catalyst to the catalyst nitride. As explained previously, it is believed that the catalyst metal is first converted to its nitride and the remaining boron nitride dissolves in the catalyst nitride and is subsequently reprecipitated as cubic boron nitride. When the catalyst employed is a catalyst nitride, there is no limitation on the relative amounts of the catalyst nitride and the boron nitride employed. Thus, in carrying out our invention with a catalyst metal, any amount of boron nitride may be present providing it is sufficient to provide nitrogen for conversion of the catalyst to the catalyst nitride. When the catalyst nitrides are employed directly as catalysts either reactant may be present in excess.

The time required for the reaction of the present invention is extremely short. Thus, satisfactory conversion of hexagonal boron nitride to cubic boron nitride has been accomplished in times as low as one-half minute. Generally, it is preferred to maintain the reactants under the reaction conditions for a time of about three to five minutes. There are no disadvantages to maintaining the reaction mixture in the cubic boron nitride stable region for extended periods of time and in some cases the size of the cubic boron nitride crystals increases with time. In general, for a three to five minute reaction, crystals of cubic boron nitride having a maximum dimension of from 1 to 300 microns are obtained.

The process of the present invention may be carried out in any type of apparatus capable of producing the pressures required at the temperatures required. Apparatus of the type described in the applications of H. T. Hall, Serial No. 488,050, now abandoned, and H. M. Strong, Serial No. 488,027, both filed February 14, 1955, now U.S. Patent No. 2,941,241, issued June 21, 1960, and the application of H. T. Hall, Serial No. 707,432, filed concurrently herewith, now U.S. Patent No. 2,941,248, also issued June 21, 1960, and all assigned to the same assignee as the present invention have been found eminently satisfactory. The disclosures of these three applications are hereby incorporated by reference into the present application.

This apparatus defines a reaction zone of controllable dimensions in which controllable temperatures and pressures may be obtained and maintained for desired periods of time. The apparatus disclosed in the aforementioned Hall applications is a high pressure device for insertion between the platens of a hydraulic press. The high pressure device consists of an annular member defining a substantially cylindrical reaction area, and two conical piston-type members or punches designed to fit into the substantially cylindrical portion of the annular member from either side of said annular member. A reaction vessel which fits into the annular member may be compressed by the two piston members to reach the pressures required in the practice of the present invention. The temperature required is obtained by any suitable means, such as, for example, by induction heating, by passing an electrical current (either alternating or direct) through the reaction vessel, or by winding heating coils around the reaction vessel.

Figs. 2 to 4 illustrate a specific apparatus which has been successfully employed for maintaining the sustained pressures and temperatures required for the practice of the present invention. In Fig. 2 of the drawing a hydraulic press capable of applying a force of 450 tons comprises a base 10 with a press bed 11 on which are mounted a plurality of vertical shafts 12 to support a movable carriage 13 with a hydraulic shaft 14. A pair of opposed recessed pistons 15 and 16 formed of hard steel on bed 11 and carriage 13 are recessed to partially position punch assemblies 17 therein, each of which punch assembly is provided with an electrical connection in the form of an annular copper conducting ring 18 with a connector 19 to supply electric current from a source of power (not shown) through assemblies 17 to the high temperature-high pressure reaction vessel which is described below. A layer of electrical insulation (laminated phenol-formaldehyde impregnated paper) 20 is provided between lower punch assembly 17 and its associated piston 15 to prevent conduction of electrical current through the press. A lateral pressure resisting assembly or belt 21 is positioned between opposed assemblies 17 to provide a multistaging pressure effect.

In Fig. 3 is shown a partially exploded view, partly in section, of the punch assemblies 17 and the lateral pressure resisting assembly 21 of Fig. 2. To facilitate the practice of the present invention by persons skilled in the art, Fig. 3 is drawn to scale with each element of the drawing proportional to its actual size and shape in the specific apparatus successfully employed. In Fig. 3 the outside diameter of punch assemblies 17 is equal to 6 inches. Each punch assembly 17 comprises a punch 22 with surrounding binding rings 23 and 24 with a soft carbon steel safety ring 25 located around binding ring 24. Punch 22 is formed of Carboloy grade 44A cemented carbide which comprises 94 percent tungsten carbide and 6 percent cobalt. This material is more completely described in the publication "Properties of Carboloy Cemented Carbides," April 2, 1951, issued by Carboloy Department, General Electric Company, Detroit, Michigan. Binding rings 23 and 24 are formed of AISI 4142 alloy steel, commercially available, and comprising, by weight, 0.4 to 0.5 percent carbon, 0.71 to 1 percent manganese, 0.4 percent phosphorus, 0.4 percent sulfur, 0.2 to 0.35 percent silicon, 0.8 to 1.1 percent chromium, and 0.15 to 0.25 percent molybdenum. Binding ring 23 is hardened to 50 Rockwell C and binding ring 24 is hardened to a Rockwell C hardness of 40. It is seen from Fig. 2 that the members of punch assembly 17 are slightly tapered on their sides. This taper is employed so as to provide a force fit so that punch 22 is under high compression in the punch assembly. Assembly of these elements is accomplished by first forcing ring 24 into safety ring 25 in a suitable press and subsequently forcing ring 23 into binding ring 24. Finally punch 22 is forced into ring 23.

As is best shown in Fig. 4, which is a scale drawing with the faces 31 of punches 22 having a diameter of 0.350 inch, each punch 22 has a generally cylindrical portion 22A having a diameter of about 1.5 inches and a height of about 2.07 inches. Each punch 22a has a tapered portion having a vertical height of about 0.47 inch which comprises a first frustoconical portion 22b at an angle of about 7° from the horizontal, a curved portion 22c, and a second frustoconical portion 22d which has a slant length of about 0.25 inch and extends at an angle of about 30° from the vertical. Binding ring 23 has an outside diameter of about 3.9 inches, binding ring 24 has an outside diameter of about 5.5 inches, and, as previously mentioned, the outside diameter of soft, safety ring 25 is 6 inches. As best seen in Fig. 2 each punch assembly 17 is flat on one side and tapers gently on the opposite side. This taper is about 7° from horizontal.

As best shown in Figs. 2 and 3, lateral pressure resisting assembly 21, which is positioned between opposed punch assemblies 17, tapers inwardly toward the center to provide an aperture 26 in axial alignment with opposed punches 22. Assembly 21 comprises an inner annular ring 27 formed of the aforementioned Carboloy grade 44A cemented carbide and two concentric binding rings 28 and 29 formed of AISI 4142 alloy steel. Rings 28 and 29 have Rockwell C hardnesses of 50 and 40, respectively. A soft carbon steel safety ring 30 surrounds outer binding ring 29. Rings 27, 28 and 29 are slightly tapered at their contact faces so as to provide the force fit arrangement previously described in connection with punch assembly 17. The individual rings of lateral pressure resisting assembly 21 are assembled in the same manner as were the various rings of punch assembly 17.

As is best shown in Fig. 3, inner annular ring 27 has an outside diameter of about 2.4 inches, a maximum height of about 1.2 inches, and a minimum inside diameter of about 0.4 inch. Ring 27, which is substantially symmetrical about a horizontal plane, comprises portions 27a which are tapered at an angle of about 7° from horizontal, curved portions 27b, and tapered portions 27c, which taper at an angle of about 11° from the vertical. Binding ring 28 has an outside diameter of about 4.8 inches, binding ring 29 has an outside diameter of about 6.4 inches, and safety ring 30 has an outside diameter of about 6.9 inches. Lateral pressure resisting assembly 21 tapers gently from the area of ring 30 to the area of ring 27 with the taper being equal to about 7° from the horizontal.

As is best shown in Fig. 4, punches 22 and ring 27 of lateral pressure resisting assembly 21 define a controllable reaction zone in which material to be subjected to elevated pressures and temperatures is positioned. As previously mentioned, Fig. 4 is a scale drawing with the faces 31 of punches 22 having a diameter of 0.350 inch. All elements in Fig. 4 conform to this scale except elements 33, 34 and 39, whose thicknesses have been exaggerated. The specimen to be subjected to high pressure and high temperature is positioned in a hollow cylindrical reaction vessel 32, which in this specific illustration is formed of pyrophyllite. Reaction vessel 32 has a height of about 0.4 inch, an outside diameter of 0.35 inch, and an inside diameter of 0.125 inch. Pyrophyllite has been chosen as the material of construction for cylindrical reaction vessel 32 for the reasons, among others, that it is readily machinable to the desired shape and is inert to the reactants under the conditions of reaction employed in the practice of the present invention. Inside of reaction vessel 32 is positioned a conducting metal tube, which in this specific illustration is formed of tantalum, and which has a height of about 0.4 inch, an outside diameter of 0.125 inch, and a wall thickness of 0.01 inch. The specimen to be subjected to elevated pressures and temperatures is positioned within the central aperture in conducting metal tube 33. In this specific illustration the specimen consists of lumps of catalyst metal or catalyst metal nitride which are surrounded by powdered hexagonal boron nitride. The reaction vessel 32 is closed or sealed at each end by conducting metal end disks 34 which have a thickness of 0.010 inch and a diameter of 0.350 inch. Positioned adjacent each disk 34 is a disk 35 of pyrophyllite having a diameter of about 0.250 inch and a thickness of about 0.10 inch. An annular conducting ring 36 of AISI 4142 alloy steel having a Rockwell C hardness of about 0.10 inch. An annular conducting ring an outside diameter of 0.350 inch and a thickness of 0.10 inch.

Inside of ring 27 of lateral pressure resisting assembly 21 and surrounding reaction vessel 32 and partially surrounding the tapered portion of each punch 22 are gasket assemblies 37, each of which comprises an inner conical pyrophyllite washer 38 having a thickness of 0.030 inch, a slant height of approximately 0.25 inch, and making an angle of 30° with the vertical. Washer 38 is surrounded by a soft carbon steel conical washer 39 having a thickness of approximately 0.010 inch and a slant height of about 0.25 inch and an angle of about 30° with respect to the vertical. Each of washers 40 has an inside diameter at its narrowest portion of 0.35 inch and an outside diameter at its narrowest portion of 0.40 inch. The 0.35 inch inner cylindrical surface of washer 40 has a height of about 0.2 inch. Washer 40 also has a tapered conical interior portion designed to cooperate with the outer surface of washer 39 and which has a taper with respect to the vertical of about 30°. The overall vertical height of washer 40 is approximately 0.43 inch and the outer surface of washer 40 is designed to conform to the shape of that portion of ring 27 with which washer 40 comes into contact.

In the operation of the high pressure-high temperature apparatus of the drawing to produce the pressures and temperatures required in the practice of the present invention, opposed recessed pistons 15 and 16 are attached respectively to pressed bed 11 and carriage 13 by any suitable means (not shown). Insulation layer 20 is then placed in the recess in piston 15 and lower punch assembly 17 is positioned in the recess in piston 15 on top of insulation layer 20. Upper punch assembly 17 is then fastened into the recess in upper recessed piston 16 by suitable means (not shown). Lower gasket assembly 37 is then positioned over lower punch 22, lower insulating disk 35 and conducting ring 36 are then positioned within lower gasket assembly 37 and conducting disk 34 is put in place. Lateral pressure resisting assembly 21 is then positioned around the parts previously assembled. Cylindrical reaction vessel 32, which contains conducting metal tube 33 and its contents is then added to the assembly. Subsequently, upper conducting disk 34, upper insulating disk 35 and upper conducting ring 36 are put into place. The final operation is the positioning and assembly of upper gasket assembly 37.

Reaction vessel 32 is subjected to the pressures required in the practice of the present invention by applying force to the high pressure-high temperature apparatus by means of shaft 14 of the press. The method of correlating the press load required to produce a given pressure within reaction vessel 32 is discussed below. After the desired pressure is reached the reaction vessel is brought to the desired temperature by electrical resistance heating of the contents of reaction vessel 32 by means of current passing through tube 33. Specifically, electrical current is supplied from one electrical connector, such as upper connector 19 to upper conducting ring 18, upper rings 25, 24, 23, upper punch 22, upper ring 36, upper disk 34, and to the tube 33 and its contents. The electrical path from the bottom of tube 33 to lower connector 19 is similar to the conducting path described above. After the reaction vessel has been held at the desired pressure and temperature for the desired time, the electrical current to the reaction vessel is cut off and the pressure is released. Cubic boron nitride which has been formed is then removed from the reaction vessel.

Although the specific apparatus of Figs. 2 to 4 includes a pyrophyllite reaction vessel surrounding a tantalum tube, it should be understood that other modifications of this apparatus may be employed. Since the function of conducting metal tube 33 is to act as a resistance heater to heat the contents of tube 33 to the desired temperature, it should be understood that any conducting metal may be employed. Thus, these tubes may be constructed of nickel, molybdenum, or other non-catalytic metal in addition to tantalum. In addition, tube 33 may also be formed of a catalyst metal. In the case where tube 33 is formed of a catalyst metal, the tube is merely filled with hexagonal boron nitride and the tube itself acts as a catalyst for the conversion of the hexagonal boron nitride to cubic boron nitride. Tube 33 may also be of non-metallic construction so long as the tube serves as a conductor or resistance heater. Thus, satisfactory results are obtained when tube 33 is formed of carbon or graphite instead of being formed of metal. In addition, pyrophyllite reaction vessel 32 may contain a number of conducting tubes therein, some of which are metallic and some of which are non-metallic. Thus, pyrophyllite cylinder 32 can surround a graphite tube, which in turn surrounds a titanium tube, for example, into which the reaction mixture is positioned. In another embodiment, conducting tube 33 may be eliminated entirely and replaced by a conducting metal wire which is surrounded by a mixture of reactants, with the conducting wire serving to heat the reactants upon passage of current therethrough.

Although a number of specific reaction vessel assembly structures have been described above, it should be understood that the reaction vessel is not critical to the carrying out of my invention. Any type of structure capable of containing the reactants at the pressure and temperature of the reaction is satisfactory.

In converting hexagonal boron nitride to cubic boron nitride by the method of the present invention, it is difficult to measure the pressure and temperature to which the reactants are subjected by direct means because of the extreme pressures employed. Therefore, each of these conditions is measured by indirect means. In measuring the pressure, recognition is made of the fact that certain metals undergo distinct changes in electrical resistance at particular pressures. Thus, bismuth undergoes a phase change at 24,800 atmospheres, thallium undergoes such a change at 43,500 atmospheres, cesium undergoes such a change at 53,500 atmospheres, and barium undergoes such a change at 77,400 atmospheres. We have found that the melting point of germanium varies directly with pressure over an extremely wide pressure range, including pressures up to and above 110,000 atmospheres, and it is known that the electrical conductivity (and resistance) of germanium undergoes a marked change at the transition of germanium from the solid to the liquid phase. Thus, by determining the hydraulic press load necessary to cause a phase change in a metal such as bismuth a point on a pressure-press load curve is determined. By filling a reaction vessel in the Hall apparatus with germanium and applying the same press load employed to obtain the phase change in bismuth, and by then heating the germanium to the temperature at which the germanium melts (as measured by a large decrease in electrical resistivity) a point on a pressure-melting point curve for germanium is determined. By carrying this same operation out with other metals such as thallium, cessium and barium, whose phase change points are known, a series of points on a melting point-pressure curve for germanium are obtained. We have found that this melting point-pressure curve is a straight line. Therefore, by applying other press loads with the hydraulic press apparatus while the reaction chamber is filled with germanium and determining the melting point of the germanium at the different press loads, the actual pressure in the chamber at a given press load is determined. The phase changes recited for the above metals were the standards for determining the pressures employed in the practice of my invention and are the basis for the pressures recited in the appended claims.

The temperature in the reaction vessel is determined by fairly conventional means such as by placing a thermocouple junction in the reaction vessel and measuring the temperature of the junction in the usual manner. We have found that one suitable method of positioning a thermocouple in the apparatus for the measurement of temperature is to run a pair of thermocouple wires between outer pyrophyllite gasket 40 and lateral pressure resisting assembly 21. These wires then pass through the joint between upper and lower gasket assemblies 37 and through holes drilled in reaction vessel 32 and tube 33 with the thermocouple junction being positioned inside of tube 33. The material to be subjected to the elevated pressure and temperature is then compacted into the cylindrical aperture defined by tube 33 and the apparatus is assembled and subjected to a high pressure, such as a presssure of 2,000 to 100,000 atmospheres. Electrical energy at a predetermined rate is then supplied the apparatus and the temperature produced by this power is measured by the thermocouple assembly. This same procedure is repeated a number of times with different power inputs to produce a calibration curve of power input versus temperature in the reaction vessel. After calibration of the apparatus by this method, the temperature of the contents of the reaction vessel is determined by the power input to the apparatus in conjunction with the calibration curve. In general, to produce a temperature of about 1800° C. in the apparatus specifically illustrated, an alternating current voltage of from about 1 to 3 volts at a current of from about 200 to 600 amperes is used to deliver the required 600 to 700 watts through tube 32.

The temperature of the reaction chamber may also be determined by measuring the resistance of heating coils, such as platinum heating coils, wound around the reaction chamber. The temperature of platinum is determined from its well known temperature coefficient of resistance. Thus, the temperature within the reaction vessel is determined by relatively simple means during the course of the reaction and the pressure within the vessel is read from a plot of the relationship between the force applied by the platens of the press to the pressure within the reaction vessel.

The temperature measured by the methods above and referred to throughout this application are the temperatures in the hottest portion of the reaction vessel. It should be understood, however, that the temperature may vary over a range of 100 to 200° C. between spaced points in the reaction vessel. In fact, I have found that the reaction is facilitated by the very existence of this temperature gradient between spaced points in the reaction vessel.

The following examples are illustrative of the practice of my invention and are not intended for purposes of limitation. In all of the examples the high pressure, high temperature apparatus of Figs. 2 to 4 was employed, with the exception that in some cases the inside diameter of pyrophyllite reaction vessel 32 was increased to about 0.155 or 0.180 inch and with the exception that conducting tube 33 was sometimes formed of graphite and sometimes consisted of both a metallic tube and a non-metallic tube. The following methods were used to establish that the product formed was actually the cubic form of boron nitride: X-ray crystallography, refractive index, density, chemical analysis, and hardness tests. The cubic boron nitride was removed from the matrix in which it was formed by dissolving the matrix in hydrochloric acid or aqua regia. This resulted in most cases in a mixture of some unreacted hexagonal boron nitride and cubic boron nitride. The cubic material was separated from the hexagonal material either by hand or by using a flotation technique in which the mixture was added to bromoform in which the hexagonal boron nitride will float and in which the cubic boron nitride sinks. In all of the examples resistance heating was employed for bringing the reactants to the desired temperature.

Example 1

This example illustrates the use of magnesium as a catalyst for the conversion of hexagonal boron nitride to cubic boron nitride. In this example either the apparatus specifically disclosed in Figs. 2 to 4 was employed or a carbon tube having an outside diameter of 0.125 inch and a wall thickness of about 0.025 inch was employed as a substitute for tantalum tube 33. Into the tantalum tube or the graphite tube were placed a mixture of 3 parts by volume of hexagonal boron nitride powder and 1 part by volume of lumps of magnesium. After subjecting this assembly for about three minutes to each of the conditions of pressure and temperature described in the table below, cubic boron nitride was formed.

| Approximate pressure, atmospheres: | Approximate temperature, °C. |
|---|---|
| 69,000 | 1300 |
| 80,000 | 1700 |
| 81,000 | 2000 |
| 86,000 | 1400 |
| 86,000 | 1500 |
| 86,000 | 1600 |
| 86,000 | 1800 |
| 87,000 | 1600 |
| 87,000 | 1300 |
| 90,000 | 1800 |
| 90,000 | 1900 |
| 90,000 | 2000 |
| 90,000 | 2100 |
| 95,000 | 1900 |

In the runs described above, the average yield of cubic boron nitride was about one-fifth carat in the form of generally cylindrical jagged crystals having an average diameter of about 0.2 to 0.4 mm. Emission spectrographic examination of the material formed at 86,000 atmospheres showed the presence of boron and magnesium. Elemental analysis of the material show the presence of 38.2 percent boron and 39.6 percent nitrogen as compared with the theoretical values of 43.6 percent boron and 56.4 percent nitrogen. This difference between the observed analysis and the theoretical analysis indicates the presence of some magnesium nitride remaining in the material. In scratch tests this material scratched polished boron carbide as well as both the cubic face and the octahedral face of diamond, indicating a hardness at least equal to the hardness of diamond. X-ray diffraction analysis of this material indicated a cubic structure analogous to zincblende with a unit cell edge length of 3.615 Angstroms ±0.001 Angstroms at 25° C. A density measurement by the sink or float method in dense liquids indicated a density of about 3.45 for the material as compared with the expected density of 3.47 from the observed unit cell size. In view of these analytical measurements, it is obvious that the material formed in this reaction is the cubic form of boron nitride.

When the procedure of this example was repeated except that no catalyst material was placed in the tube, the hexagonal boron nitride was not converted to cubic boron nitride even though temperatures and pressures in the cubic boron nitride stable region were employed and although sufficient time for the conversion was allowed. When a portion of the cubic boron nitride prepared in this example was subjected to a presusre of 50,000 atmospheres and a temperature of 2400° C., the cubic material was reconverted to hexagonal boron nitride as shown by the soft powdery nature of the resulting material and the fact that this material was shown by X-ray diffraction analysis to have a cubic configuration no longer, but instead the configuration of hexagonal boron nitride.

Example 2

A magnesium wire was positioned in and spaced from a pyrophyllite sleeve and the zone between the wire and the sleeve was packed with hexagonal boron nitride supplied by the Norton Company. This assembly was sealed with tantalum end disks and subjected to a pressure of about 90,000 atmopsheres at a temperature of about 1800° C. for one minute. At the end of this time the pressure and temperature were returned to one atmosphere and room temperature, respectively, and the product was isolated from the matrix in which it was formed by dissolving the matrix in concentrated hydrochloric acid. This resulted in a number of reddish particles which easily scratched boron carbide and had a density of about 3.45 by the sink or float method in dense liquids.

Eaxmple 3

Example 1 was twice repeated, once with sodium and once with potassium in place of magnesium. Hexagonal boron nitride was converted to cubic boron nitride with sodium at 1750° C. and 93,000 atmospheres and with potassium at 95,000 atmospheres and 1700° C.

Example 4

Following the procedure of Example 1, hexagonal boron nitride was converted to cubic boron nitride using lithium in place of the magnesium of Example 1. The table below lists the pressures and temperatures at which the conversion was accomplished.

| Approximate pressure, atmospheres: | Approximate temperature, °C. |
|---|---|
| 73,000 | 1300 |
| 86,000 | 1700 |

Example 5

The procedure of Example 1 was repeated except that lumps of barium replaced the magnesium of Example 1. The table below indicates the pressures and temperatures at which the conversion of hexagonal boron nitride to cubic boron nitride was accomplished.

| Approximate pressure, atmospheres: | Approximate temperatures, °C. |
|---|---|
| 86,000 | 1700 |
| 80,000 | 1600 |

Example 6

Following the procedure of Example 1 except with strontium substituted for the magnesium of Example 1, hexagonal boron nitride was converted to cubic boron nitride at a pressure of 87,000 atmospheres and a temperature of 1600° C.

Example 7

The procedure of Example 1 was repeated except that lumps of calcium were substituted for the lumps of magnesium in Example 1. The table below lists the pressures and temperatures at which the conversion of hexagonal boron nitride to cubic boron nitride was accomplished.

| Approximate pressure, atmospheres: | Approximate temperature, °C. |
|---|---|
| 69,000 | 1300 |
| 69,000 | 1400 |
| 81,000 | 1800 |
| 85,000 | 1800 |
| 86,000 | 1600 |
| 90,000 | 1900 |

Example 8

The procedure of Example 1 was repeated except that lumps of lead were employed as a catalyst with a pressure of 86,000 atmospheres and a temperature of 1800° C. being employed to effect the conversion of hexagonal boron nitride to cubic boron nitride.

Example 9

The procedure of Example 1 was again repeated employing antimony as a catalyst with cubic boron nitride being formed from hexagonal boron nitride at a pressure of 86,000 atmospheres and a temperature of about 1800° C.

Example 10

This example illustrates the use of tin as a catalyst for the conversion of hexagonal boron nitride to cubic boron nitride. The table below lists the approximate pressures and temperatures at which this conversion was accomplished.

| Approximate pressure, atmospheres: | Approximate temperature, ° C. |
|---|---|
| 90,000 | 1900 |
| 86,000 | 1700 |
| 86,000 | 1800 |
| 87,000 | 1800 |

Examples 11 and 12, which follow, illustrate the use of a nitride as a catalyst for the conversion.

Example 11

Following the procedure of Example 1, a powdered mixture of 3 parts by volume of boron nitride and 1 part by volume of magnesium nitride was subjected to a pressure of about 86,000 atmospheres and a temperature of about 1600° C. to effect the conversion of hexagonal boron nitride to cubic boron nitride.

Example 12

The procedure of Example 11 was repeated except that lithium nitride was substituted for the magnesium nitride. Hexagonal boron nitride was successfully converted to cubic boron nitride at the pressures and temperatures shown below.

| Approximate pressure, atmospheres: | Approximate temperature, ° C. |
|---|---|
| 85,000 | 1940 |
| 85,000 | 1790 |
| 85,000 | 1900 |
| 85,000 | 2020 |
| 85,000 | 1635 |
| 85,000 | 1610 |
| 72,000 | 1800 |
| 75,000 | 1900 |
| 77,500 | 1800 |
| 55,000 | 1560 |
| 55,000 | 1530 |

Analysis of some material prepared at 72,000 atm. showed 41.5 percent boron and 50.1 percent nitrogen.

Example 13

The procedure of Example 11 was repeated except that calcium nitride was substituted for the magnesium nitride. Hexagonal boron nitride was successfully converted to cubic boron nitride at the pressures and temperatures listed below.

| Approximate pressure, atmospheres: | Approximate temperature, ° C. |
|---|---|
| 55,000 | 1560 |
| 85,000 | 2030 |
| 85,000 | 1635 |
| 70,000 | 1600 |
| 60,000 | 1700 |
| 62,000 | 1700 |

Example 14

The procedure of Example 11 was repeated except that a mixture of calcium nitride and lithium nitride was substituted for the magnesium nitride. Hexagonal boron nitride was successfully converted to cubic boron nitride at a pressure of about 85,000 atmospheres and a temperature of about 1600° C.

Example 15

The procedure of Example 11 was repeated except that a mixture of calcium nitride and sodium was substituted for the magnesium nitride. Hexagonal boron nitride was successfully converted to cubic boron nitride at a pressure of about 70,000 atmospheres and a temperature of about 1800° C.

Examples 16 and 17, which follow, illustrate the use of a mixture of a metallic catalyst and a catalyst nitride for the conversion.

Example 16

Following the procedure of Example 1 a mixture of about 3 parts by volume of hexagonal boron nitride and 1 part by volume of equal volume mixture of magnesium nitride and tin lumps were compressed at a pressure of about 86,000 atmospheres. Using this arrangement and pressure hexagonal boron nitride was successfully converted to cubic boron nitride at temperatures of about 1500° C. and about 1700° C.

Example 17

The procedure of Example 16 was repeated except that lumps of magnesium were substituted for the lumps of tin. With this arrangement hexagonal boron nitride was converted to cubic boron nitride at a pressure of about 86,000 atmospheres and a temperature of about 1600° C.

Example 18

The procedure of Example 16 was repeated except that lumps of sodium were substituted for the lumps of tin. With this arrangement hexagonal boron nitride was converted to cubic boron nitride at a pressure of about 86,000 atmospheres and a temperature of about 1700° C., and about 1900° C. The cubic boron nitride prepared by this method occurred in larger crystals than that prepared by other methods. Octahedral fragments of cubic boron nitride up to 300 microns on edge were thus obtained.

Examples 19 and 20, which follow, illustrate the use of elemental boron rather than hexagonal boron nitride as a starting material in the process of the present invention. In these examples the pyrophyllite cylinder 32 had an inside diameter of 0.155 inch and surrounded a tantalum tube having an outside diameter of 0.155 inch and an inside diameter of 0.136 inch.

Example 19

The tantalum tube described above was packed with alternate layers of calcium cyanamid and a mixture of boron and calcium. When this sample was subjected to a pressure of about 83,000 atmospheres at a temperature of about 1800° C. for 10 minutes, cubic boron nitride was formed.

Example 20

The tantalum tube described above was packed with boron powder in the center and a mixture of nickel and magnesium nitride at each end and subjected to a pressure of 86,000 atmospheres at a temperature of about 1900° C. for 6 minutes. At the end of this time cubic boron nitride had been formed.

Because of the wide variety of reaction conditions and reactants which may be employed in the process of the present invention, the foregoing examples obviously have not illustrated every possible modification of the present invention. Therefore, the scope of my invention is intended to be defined by the appended claims rather than by the foregoing examples.

In Fig. 5 is shown, partly in section, one of the abrasive articles of the present invention. Fig. 5 shows a cutting tool 41 which comprises a shank or base portion 42, having a tapered end 43, to which is bonded a crystal of cubic boron nitride 44. The cubic boron nitride may be bonded to the base by any suitable method. One such method is described in Patent 2,570,248, Kelley, and comprises the bonding of the cubic boron nitride to the base through intermediate layers of solder 45 and titanium hydride 46. When this method of bonding is employed, a hole is first drilled into the tapered end 43 of the cutting tool. The insides of this hole are coated with a layer of solder and then a slurry of titanium hydride in a volatile organic liquid is painted on the surface of the solder. The type of solder employed is not critical. However, it is preferred to utilize a solder having a melting point higher than the decomposition temperature of titanium hydride. One suitable solder for this purpose is a eutectic mixture of silver and copper. After painting the solder surface with the slurry, a cubic boron nitride crystal is placed in the hole. This entire assembly is then heated in a vacuum to a temperature at which the titanium hydride decomposes. This results in the crystal being firmly bonded to the tapered end through the titanium hydride layer and the solder layer. The end of the tool is then ground away to expose the cubic boron nitride crystal as shown in Fig. 5. Suitable organic liquids for forming the titanium hydride slurry include, for example, amyl acetate, methyl acetate, ethyl acetate, etc. A cutting tool corresponding to that shown in Fig. 5 has been employed to turn a steel cylinder with satisfactory turning being obtained without any adverse effect on the cutting tool.

In Fig. 6 is shown, partly in section, another abrasive article within the scope of the present invention, in particular, a cubic boron nitride abrasive wheel. This wheel comprises a central portion 47 and an outer portion 48 containing cubic boron nitride. The center or base portion may be comprised of metal such as steel or of any type of plastic material such as, for example, a phenol-formaldehyde resin. The outer abrasive portion comprises cubic boron nitride particles or grit embedded in any suitable medium. In one preferred embodiment of the invention the cubic boron nitride particles are embedded in a thermosetting resinous material such as a melamine-formaldehyde resinous material or a phenol-formaldehyde resinous material. This grinding wheel of Fig. 6 may be formed by a single molding operation in which a first powdered resinous material is placed in the center of a mold while the mixture of resinous powdered material and cubic boron nitride are placed in another portion of the mold surrounding the first portion. This entire assembly is then subjected to heat and pressure to cure the entire assembly and thus form the wheel of Fig. 6. This wheel is provided with a central aperture 49 which is adapted to fit on a rotatable shaft (not shown) which is driven by any suitable means (not shown).

In addition to employing the cubic boron nitride of the present invention in abrasive articles such as described in Figs. 5 and 6, this material is also useful in forming diamond lapping powders. Diamond lapping powders are employed to grind the surface of diamond to any desired shape. In general, these lapping powders are used by placing them on a rotating cast iron wheel and pressing the surface of the diamond which is to be ground against the lapping compound. These lapping compounds generally comprise abrasive particles such as fine diamond powder in a lubricating medium such as olive oil. When the surface of a diamond was lapped with a commercial lapping powder and with a lapping powder prepared by mixing fine cubic boron nitride powder and olive oil, it was found that the cubic boron nitride lapping compound was as efficient as the commercial lapping compound in grinding down the surface of a diamond.

From the above description of my invention, it is obvious that the cubic boron nitride is useful as an abrasive article in any application to which presently available abrasive materials have been applied. In addition, cubic boron nitride is useful in articles such as glass cutters and as jewels for use in articles such as timepieces.

What I claim as new and desire to secure by Letters Patent of the United States is:

1. Cubic crystal structure boron nitride having a zincblende cubic structure with a unit cell edge length of about 3.615 Angstroms at 25° C.

2. The method of making cubic crystal structure boron nitride which comprises subjecting hexagonal boron nitride to a pressure of at least about 50,000 atmospheres and a temperature of at least about 1200° C. in the presence of at least one catalyst selected from the class consisting of alkali metals, alkaline earth metals, lead, antimony, tin and nitrides of the foregoing metals, said pressure and temperature being selected to be in the range in which the particular catalyst is operative to catalyze the conversion of hexagonal boron nitride to the above cubic boron nitride, and thereafter recovering boron nitride having a cubic crystal structure.

3. The method of claim 2 in which the catalyst is an alkali metal.

4. The method of claim 2 in which the catalyst is an alkaline earth metal.

5. The method of claim 2 in which the catalyst is magnesium.

6. The method of claim 2 in which the catalyst is calcium.

7. The method of converting hexagonal boron nitride to cubic crystal structure boron nitride which comprises subjecting hexagonal boron nitride to a pressure of from about 50,000 to 110,000 atmospheres and a temperature of about 1200° C. to 2000° C. in the presence of at least one catalyst selected from the class consisting of alkali metals, alkaline earth metals, lead, antimony, tin, and nitrides of the foregoing metals, said pressure and temperature being selected to be in the range in which the particular catalyst is operative to catalyze the conversion of hexagonal boron nitride to the above cubic boron nitride, and thereafter recovering boron nitride having a cubic crystal structure.

8. An abrasive article comprising a base member having a surface abrasive layer of cubic crystal structure boron nitride having a zincblende cubic structure in which the cubic boron nitride has a hardness substantially equal to the hardness of diamond.

9. A cutting tool comprising a base member having a crystal of cubic crystal structure boron nitride having a zincblende cubic structure bonded to its surface, the said cubic boron nitride having a hardness substantially equal to diamond.

10. An abrasive wheel comprising a central portion to which an external abrasive layer of cubic crystal structure boron nitride having a zincblende cubic structure is bonded, the cubic boron nitride having a hardness substantially equal to the hardness of diamond.

11. A diamond lapping compound containing as its essential abrasive ingredient cubic crystal structure boron nitride having a zincblende cubic structure, the said cubic boron nitride having a hardness substantially equal to the hardness of diamond.

12. Cubic crystal structure boron nitride having a zincblende cubic structure and having a hardness substantially equal to the hardness of diamond.

13. The method of making cubic crystal structure boron nitride having a zincblende cubic structure which comprises subjecting to a temperature of at least 1200° C. and a pressure of at least 50,000 atmospheres a mixture of ingredients comprising (1) at least one catalyst metal selected from the class consisting of alkali metals, alkaline earth metals, lead, antimony, tin and nitrides of the foregoing metals, (2) a source of boron selected from the class consisting of elemental boron, hexagonal boron nitride and compounds of boron decomposable to elemental boron at the above elevated temperatures and pressures, and (3) a source of nitrogen selected from the class consisting of hexagonal boron nitride and nitrogen-containing compounds of the aforesaid catalyst materials which provide a source of nitrogen under the temperatures and pressures used for effecting formation of the cubic crystal structure boron nitride, and thereafter recovering cubic crystal structure boron nitride.

References Cited in the file of this patent

UNITED STATES PATENTS

| | | |
|---|---|---|
| 1,071,488 | Weintraub | Aug. 26, 1913 |
| 2,544,414 | Bridgman et al. | Mar. 6, 1951 |
| 2,636,825 | Nicholson | Apr. 28, 1953 |
| 2,808,314 | Taylor | Oct. 1, 1957 |
| 2,839,413 | Taylor | June 17, 1958 |

OTHER REFERENCES

Bridgman: "Review of Modern Physics," vol. 18, pages 1–93, 291 (April 1946).

Wentorf: "J. Chem. Phys.," vol. 26, page 956 (1957).

Jaeger et al.: "Chem. Abstracts," vol. 21, page 1572 (1927), article abstracts "Verslag Akap. Wetenschappen Amsterdam," vol. 35, pp. 857–61 (1926).

Finlay et al.: "American Ceramic Soc. Bull.," vol. 31, No. 4, pp. 141–143 (1952).